(12) United States Patent
Barbir et al.

(10) Patent No.: US 7,610,332 B2
(45) Date of Patent: Oct. 27, 2009

(54) OVERLAY NETWORKS

(75) Inventors: Abdulkadev Barbir, Nepean (CA); Nalin Mistry, Nepean (CA); Wayne Ding, Kanata (CA); Reinaldo Penno, Sunnyvale, CA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 677 days.

(21) Appl. No.: 10/178,131

(22) Filed: Jun. 24, 2002

(65) Prior Publication Data

US 2003/0135468 A1 Jul. 17, 2003

Related U.S. Application Data

(60) Provisional application No. 60/349,044, filed on Jan. 15, 2002.

(51) Int. Cl.
*G06F 15/16* (2006.01)
(52) U.S. Cl. .................. 709/203; 709/200; 709/227; 709/238
(58) Field of Classification Search .............. 709/205, 709/220, 227, 228, 230, 203, 238, 200; 726/3, 726/6, 14, 15
See application file for complete search history.

(56) References Cited

U.S. PATENT DOCUMENTS

| 6,105,027 A  * | 8/2000  | Schneider et al. ............... 707/9    |
| 6,178,505 B1 * | 1/2001  | Schneider et al. ............ 713/168     |
| 6,226,748 B1 * | 5/2001  | Bots et al. ...................... 726/15 |
| 6,304,973 B1 * | 10/2001 | Williams ........................ 726/3   |
| 6,636,898 B1 * | 10/2003 | Ludovici et al. ............. 709/250     |
| 6,785,728 B1 * | 8/2004  | Schneider et al. ............ 709/229     |
| 7,010,615 B1 * | 3/2006  | Tezuka et al. ................ 709/246    |

* cited by examiner

*Primary Examiner*—Salad Abdullahi
*Assistant Examiner*—El Hadji M Sall
(74) *Attorney, Agent, or Firm*—Anderson Gorecki & Manaras (57) ABSTRACT

An overlay network includes a virtual content server for representing a content provider in a virtual content network and at least a client having a membership in the virtual content network and a content path between the virtual content server and the client. Each node in the content path is also a member of the virtual content network and each link between nodes is provided by a tunnel to ensure trust and integrity at the content level.

9 Claims, 3 Drawing Sheets

OVERLAY NETWORKS

FIELD OF THE INVENTION

The present invention relates to overlay networks.

BACKGROUND OF THE INVENTION

Content delivery is of increasing importance to the overall architecture of the web. Content providers and content consumers are interested in value-add services that operate on content before its delivery to content consumer. Current proposals for providing services that would be deployed in the network involve, for example, a web proxy cache between the origin server and the client, that would transform or filter content. Examples of proposed services include assembling personalized web pages, adding user-specific regional information to web pages, virus scanning, content adaptation for clients with limited bandwidth, language translation, and the like.

Providing edge services have also paved the road to the use of Content Services Overlay Networks, whereby, the customization of the content can be performed across service engines or application gateways that span multiple networks. Content Services Overlay Networks can consist of service engines that belong to different authoritative domains that agree to cooperate together to provide value added service on the content on behalf of content providers.

However, the introduction of intermediaries in the content path requires the development of mechanisms that guarantee the integrity of the content in transit in the Internet between client/intermediary, intermediary/intermediary, and intermediary/origin server. This in return raises serious questions about the integrity of the content as delivered to the consumer, and whether the content provider or content consumer authorizes the adaptations that were performed on the content. For example, in transparent caching, a proxy server instead of the intended server can silently fulfill user's requests for the content. In general, transparent caching can be performed without consent of the user or the content provider.

Any proposal must protect end-to-end data integrity by supporting end-host detection and response to inappropriate behavior by intermediaries. Certainly, the presence of intermediaries and caches in the content path add intelligence within the public network, where content storage and/or adaptation can occur. Thus, what is needed is an approach that ensures the security, trust and integrity of content in an intelligent network. In the essence, there should be an approach that guarantee the end-to-end data integrity in a network with distributed intelligence.

Content providers can describe the list of adaptations, modifications, cache-ability and policies that they authorize on their content in whole or any dynamically generated parts in content profiles. The content profile also includes the set of policies that they would like to be used to determine the allowable set of modifications that could be used on the content.

In order to ensure content trust and integrity a mechanism should be developed that allow the creation of content profiles. The profiles encapsulate information about the content and their associated polices. This includes information such as available variants at the content source, encoding method, and dimensions. Content profiles and policies also include information about what is and is not allowed in terms of use or manipulation of that content (e.g. do not allow legal documents to be translated into another language). Furthermore, content profiles must be able applicable to static and dynamically generated content. The static content and the dynamically generated content can also be cacheable.

Content policies are an integral part of the content profile for a given piece of content. A content profile must encapsulate all of the information about the content, which is needed to make any of the adaptation decisions required for that content. Ensuring the integrity of content in the Internet requires the development of a generalized, protocol-independent definition of content profiles.

Content profiles may be stored as part of the content or as separate entities. In this regard, there may be a need to develop appropriate protocols that distribute and invalidate content profiles in the network in a secure manner.

A proposed method enables content owners to express how their content is treated as part of the content message. The method allows for fine-grained delegation of modification rights. The method allows any party to validate the message with respect to owner's intentions, even if several intermediaries are involved in the modification process. In particular, the requester can validate the final message. The method is friendly to caches whereby partially modified message forms can be cached. This is because the method separates the content from the authorization and validation information.

In the method, the content owner specifies content as a set of parts, some of which are immutable and some of which are replaceable. Each part has permissions, and the set of parts and their permissions is the message "manifest", an index to the message. The content owner's signature on the manifest specifies his/her intentions.

In order for the owner to delegate modification rights verifiable to parts of a message, the message must have well-defined part boundaries. This can be accomplished by specifying byte ranges with MIME or other standards. The manifest names each part and its hash value: non-invertible, collision-resistant function of each byte of the part. The modification right for a part includes both the permitted action and the identification of the parties authorized to perform the action. The modification rights can be extended to specify content type, size, resolution and method.

Each party that modifies the message in accordance with the owner instructions must attach an action notification to the message. This refers to the permission in the manifest, the message part, the action, the hash of the manifest, the identity of the editor, and a signature over these items. Because, the manifest and the signed actions are separate from the content, the content remains cacheable even in partially modified from. The manifest concept is similar to the W3C XML Digital Signature standard. This allows for the possibility of including information about the content that might not be part of the current content, such as the contents associated with URL. The method separates Content profile from the content and is a good candidate to be used as a building block for defining content profiles that include the rules that are associated with it. It can also be used as a building block for developing techniques that enable the content provider to verify the operations of intermediaries.

The content path describes the path that content requests and responses take through the network. In the traditional client/server Internet end-to-end model content requests and responses flow between the client and the content server.

However, in an intelligent network, content requests and responses may flow between a client, a single or group of intermediaries and a content server. Content requests and responses may also be directed to remote callout servers that perform added content services.

To ensure content integrity and security, every intermediary in the content path must be authorized by the content provider to act on the content. Content profiles can be used to enforce the rules and policies that are associated with that content. What is needed is a proper model that ensures that all the entities in the content path are entities with legal access to the content and its associated profiles.

Overlay networks are a powerful abstraction that creates a virtual network of connected devices layered on an existing underlying network in order to provide new network functionality. The functionality can be packet based or content based.

In packet based VPNs, the emphasis is on transporting packets in a secure fashion across a public medium. The level of security depends on the tunneling mechanism that is used. This type of VPNs examine the packet headers at a given protocol stack in order to make a routing or forwarding decision. There is no consideration to which content the packets belong to and no attempt to relate the packets to a given content profile.

At the content level, it is possible to define Edge Networks consisting of intermediaries in the network for the delivery of content in a close proximity to the content consumer. These overlay networks create a virtual overlay on top of IP packet networks, that via 'intermediaries' enables the necessary network infrastructure to provide better content delivery services.

There are two forms of edge servers, the 'delegate' and the 'surrogate'. 'Delegates', are authorized agents 'intermediaries' that act on behalf of 'clients'. Surrogates on the other hand, are authorized agent 'intermediaries' that act on behalf of 'origin servers'. Due to their strategic location in the network, Edge servers are ideal candidates for performing content delivery and 'content services'.

In a similar fashion overlay networks can be used to construct Content Services Networks. In this case, Application Gateways can be introduced between independent end-to-end sessions to construct a specialized form of application network Overlays. Content service networks provide services that act on content flowing through the 'content path'. Content service networks are constrained to provide services only on the 'content path', as opposed to general applications.

There are other models that can be used within the Internet for providing content services. However, regardless of the nature of the network, there should exist mechanisms that allow the establishment of a trust model for the content.

SUMMARY OF THE INVENTION

An object of the present invention is to provide an improved overlay network.

Accordingly, the present invention provides layer-7 Virtual Private Networks focused on content. These networks are overlay networks permitting establishment of a framework for data trust and integrity at the content level.

In accordance with an aspect of the present invention there is provided an overlay network comprising: a virtual content server for representing a content provider in a virtual content network; a client having a membership in the virtual content network; and a content path between the virtual content server and the client for transferring content with trust and integrity at a content level.

In accordance with an aspect of the present invention there is provided a method of conveying content in a network comprising the steps of: establishing an identifier; assigning the identifier to an entity desiring content thereby making the entity as a first member; establishing a connection between the first member and a content provider; and transferring content between the content provider and the first member.

The present invention introduces the concept of Virtual Private Content Networks (VPCN) as a layer 7 overlay network that ensures the trust, integrity and security of content. The VPCN concept associates a content profile or attribute with the content. The content profile determines the rules and polices that are associated with the content as a whole or any part that is dynamically generated. Intermediaries that deal with content must be members of a VPCN. Intermediaries within a VPCN are treated as extension or authorized agents of the content source. In VPCN content traverses among the members using content tunnels that ensure that content is received by authorized entities. In a VPCN there are provisions that enable the content provider to verify that the intermediary is acting on the content as specified in the content profile.

Conveniently the emphasis in the present description is on responses as opposed to requests. However, the present invention can be easily extended to cover that feature.

BRIEF DESCRIPTION OF THE DRAWINGS

The present invention will be further understood from the following detailed description of an embodiment with reference to the drawings in which.

DETAILED DESCRIPTION OF THE PREFERRED EMBODIMENT

Figure 1:
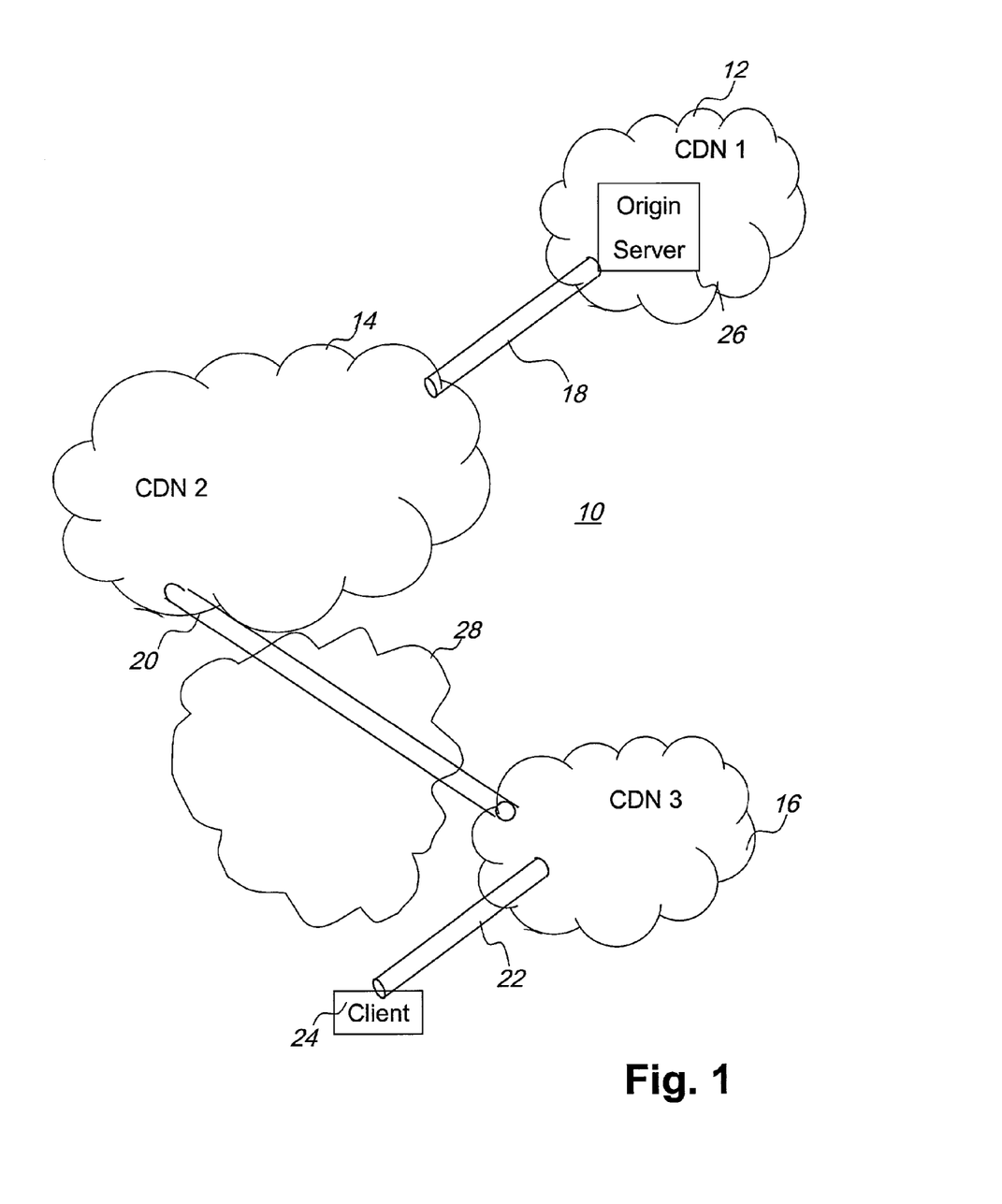
FIG. 1 illustrates a content overlay network in accordance with an embodiment of the present invention.

Referring to FIG. 1, there is illustrated a content overlay network in accordance with an embodiment of the present invention. The content overlay network 10 of FIG. 1 includes a plurality of content distribution networks 12, 14 and 16, each connected by content tunnels 18, 20, 22 to, for example a client 24. The content tunnels are used to ensure that content from an origin server 26 is delivered to the client 24, even when public networks, for example the Internet 28 are traversed.

Figure 2:
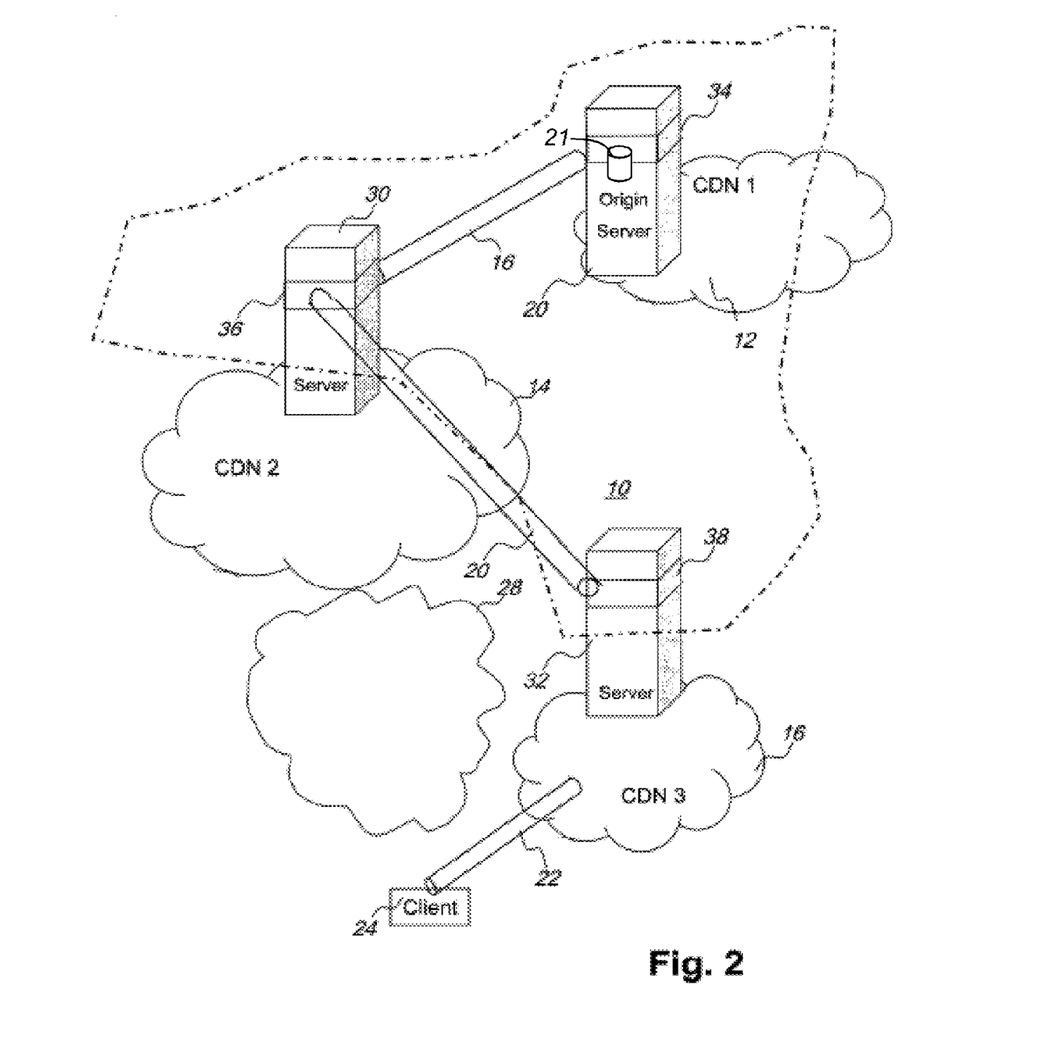
FIG. 2 illustrates in further detail the content overlay network of FIG. 1.

Referring to FIG. 2, there is illustrated in further detail the content overlay networks of FIG. 1. In FIG. 2, each content distribution network (12, 14, 16) is shown having a server 26, 30, 32, respectively. Each server is shown diagrammatically as having a portion thereof 34, 36, and 38, respectively associated with a virtual private content network 40. Hence, while physical resources in physical networks are used to implement the virtual private content network 40, the VPCN can be considered as a separate logical entity from the network supporting it. In fact, the same physical resources can be used to provide a plurality of separate and distinct virtual private content network.

The section provides the definitions of a number of terms used to refer to the roles, participants, and objects involved in Virtual Private Content Networks. Although the following uses many terms used in HTTP or web caching technology, this vocabulary is applicable to other protocols and content networks.

Action
An action is a form of a policy action that results in the execution of an 'content service module' when 'conditions' of a 'rule' are met.

Authorative Domain
A logical domain in which the network elements have rights, either delegated or inherited to act authoritatively on behalf of a party. This logical domain may be wholly contained within the administrative domain of the party, or it may be a collection of administrative domains in which the party rights have been delegated.

Cache
A program's local store of response messages and the subsystem that controls its message storage, retrieval, and deletion. A cache stores cacheable responses in order to reduce the response time and network bandwidth consumption on future, equivalent requests. Any client or server may include a cache, however, a cache cannot be used by a server that is acting as a tunnel.

Caching Proxy
A proxy with a cache, acting as a server to clients, and a client to servers. Caching proxies are often referred to as "proxy caches" or simply "caches". The term "proxy" is also frequently misused when referring to caching proxies.

Client
A program that establishes connections for the purpose of sending requests.

Condition
A form of a policy condition that is an expression which is used to determine whether a 'rule' 'action' should be executed.

Content Consumer
The 'client' that is the final destination of content delivery.

Content Path
The content path describes the path that content requests and responses take through the network. Typically, content requests and responses flow between a client, one or more intermediaries, and a content server.

Content Attribute
See content profile.

Content Profile
A content profile consists of a set of elements that describe available variants for given content. The profile also includes policy information about allowable transformations, adaptations, and Digital Rights Management that are applicable for that content. The profile can be applicable to a specific piece of content, a set or class of content, or an aggregation of content from several locations. The profile is also applicable to dynamically generated content.

Content Server
The server that delivers the content. It may be an 'origin server', replica server, 'surrogate' or parent proxy.

Content Service
A service operating on and providing a value-add to content.

Delegate
A caching proxy located near or at the network access point of the 'user agent', delegated the authority to operate on behalf of, and typically working in close cooperation with a group of 'user agents'.

In-Path
In-Path Content Services are naturally within the message path of the application they are associated with. This may be an application proxy, gateway, or in the extreme case, one of the end-hosts, that is party to the application.

Intermediary
Intermediaries are application gateway devices located in the content path between client and origin server. Caching proxies' and 'surrogates' are probably the most commonly known and used intermediaries today.

Overlay Network
A set of connected network elements layered onto existing underlying networks, and presented as a virtual application layer to both 'clients' and 'origin servers'.

Out-Of-Path
Out-of-Path Content Services are not natively in the transport path of an application. In other words, they are not necessarily resident (or co-resident) on entities that are natively in the path of application flows.

PDP
See 'policy decision point'.

PEP
See 'policy enforcement point'.

Policy Decision Point
A logical entity that makes policy decisions for itself or for other network elements that request such decisions.

Policy Enforcement Point
A logical entity that enforces policy decisions.

Surrogate
A gateway co-located with an origin server, or at a different point in the network, delegated the authority to operate on behalf of, and typically working in close cooperation with, one or more origin servers. Responses are typically delivered from an internal cache.

Surrogates may derive cache entries from the origin server or from another of the origin server's delegates. In some cases a surrogate may tunnel such requests.

Devices commonly known as "reverse proxies" and "(origin) server accelerators" are both more properly defined as surrogates.

User Agent
The client that initiates a request. These are often browsers, editors, spiders (web-traversing robots), or other end user tools.

VPN
See Virtual Private Network

Virtual Private Network
Virtual Private Networks (VPN) represents communication between a set of sites making use of a shared network infrastructure. Multiple sites of a private network may therefore communicate via the public infrastructure, in order to facilitate the operation of the private network. The logical structure of the VPN, such as addressing, topology, connectivity, reach-ability and access control, is equivalent to part of or all of a conventional private network using private facilities The Internet provides an attractive medium for the distribution of content in electronic form. However, the ease of delivering and the ease of manipulation of information in electronic form make tracking such acts intractable. To address these issues a model that guarantee content trust, security and integrity must be developed. The model should create an environment in which information cannot be stored or manipulated in the network without the consent of content source and/or the content consumers.

In order to provide content delivery and content services, there may be a need to store/cache and/or adapt the content in the network in its transit from the content source, origin server 20, to the content consumer, client 24 in FIGS. 1 and 2. In order to be able to provide content delivery and services in a legal and trust worthy manner, the entity that is providing the services must guarantee the following minimum functionality:

Content source (owners) must be assured that their content is used and manipulated only in authorized ways.

Content providers must be able to remove, update, and modify their content on the fly.

Content providers are able to maintain control over literary or copyrighted assets.

Content providers are compensated for all uses of the content.

Privacy rights of users of content are preserved.

Diverse business models related to content could be implemented.

At the content level, the content path may traverse one or more of the following components: Client, Delegate, Service Modules, Surrogate and Origin Server. A proper trust model must ensure the integrity of the content throughout the whole content path. Here, the concept of overlay networks can be used to construct Virtual Private Content Networks (VPCN) as an overlay network that has as members all the entities that are on the content path. All the members' of a VPCN agree to act on the content as described in the content profile. Content profiles can be stored in a single location or distributed manner in the Internet or the network.

Hence, a VPCN represents a trusted closed group of entities that agree to deliver, store/cache, modify or adapt content as specified by the rules and polices in the content profile. In a VPCN, the content provider is a member, eg. origin server 20, and the owner of the VPCN 40. Any surrogate or an application gateway that is in the content path must also be a member of the VPCN.

Members of a VPCN can belong to different administrative domains. FIG. 2 depicts the construction of a VPCN as an overlay network including virtual servers based on real servers, e.g., stored on a computer readable medium 21 associated with origin server 20. However the overlay network may include service modules and content servers that belong to various Edge Services Networks.

Figure 3:
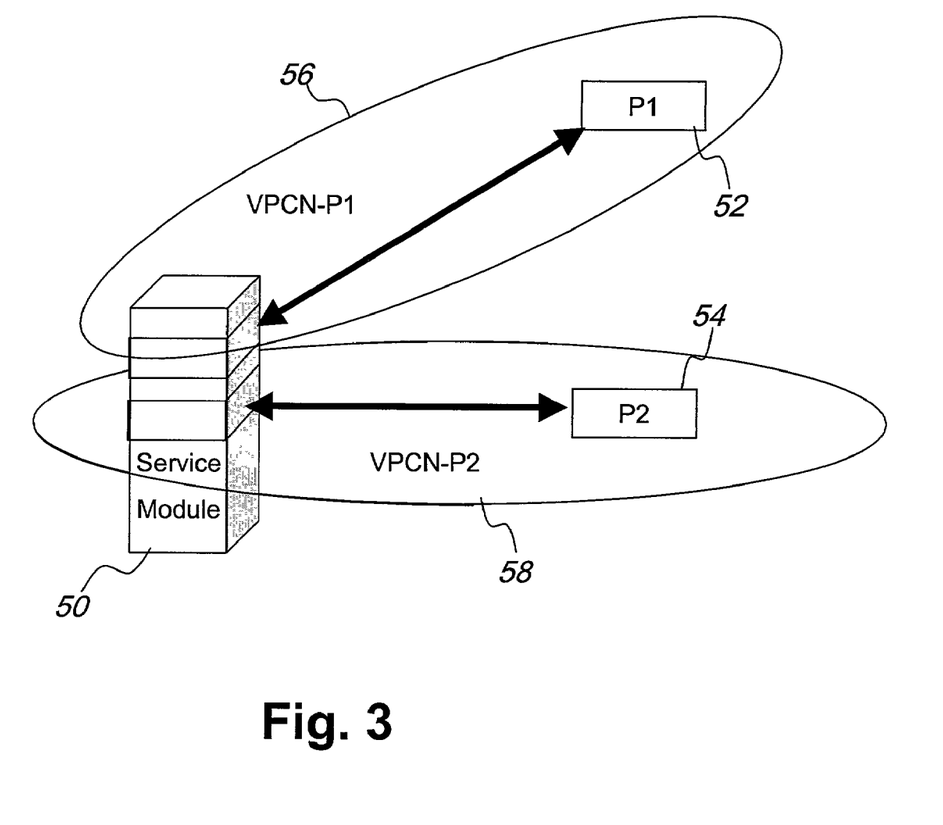
FIG. 3 illustrates a representation of two virtual private content network in accordance with another embodiment of the present invention.

Referring to FIG. 3 there is illustrated a representation of two virtual private content networks in accordance with another embodiment of the present invention.

From FIG. 3, a service module 50 can be the broker for content from content providers P1, 52 and P2, 54. In this case the service module can be a member of content trust overlays termed VPCN-P1 56 with provider P1, 52 and a member of a content trust overlay termed VPCN-P2, 58 with provider P2, 54. Each VPCN has an association set of policies and attributes. The set of policies and attributes are negotiated between the service module 50 and the content provider. A client or delegate can subscribe to become a member of the VPCNs either by subscribing to a default set of policies and attributes or by negotiating a subset. In the simplified model of FIG. 3, the VPCN has a publisher and consumers of the content thus allowing support for content push and pop models plus the ability to enforce policies.

The concept of VPCN enables deployment of layer 7 content networks, independent of physical topology. Thus, the term "virtual" implies the ability to allow a geographically distributed group of hosts to interact and be managed at the content level as a single logical network without concern to physical location. The term 'private' is simply defined as a closed user group with secure access. It is important to note here that security can be achieved through various techniques. The choice of the technique is based on overlay network that delivers the content. In addition, the choice of security is also based on the nature of the content. In some cases, there may be a need to encrypt the data. However, in some other cases such as live streaming sessions, the use of encryption may not be appropriate. Data security is achieved through the use of Content Tunnels that establish a trusted path between any two end points. The term Content refers to layer 7 content. The VPCN concept leads to virtual networks that provide content confidentiality, integrity, and authentication within the content path.

The previous sections have stated that VPCN can be constructed as an overlay network on top of other overlay networks such as Edge Services Networks. When implementing VPCN care must be taken to ensure the integrity of content across the content path. In this regard, it is possible to implement a VPCN using similar techniques to those used for Virtual Private Networks.

A VPCN has the following characteristics:

1. Confidentiality. : The VPCN ensures the privacy of content data sent over it and protect it from interception by eavesdroppers. That is, content is protected along the content path.
2. Authenticity. The VPCN ensures that intermediaries accessing it are authorized members of the VPCN community. In addition, the VPCN should ensure the authenticity of the data and its source, that is, the senders need to be known.
3. Integrity. The VPCN ensures that the data received the same data was transmitted. Hence, the VPCN must protect against data corruption by transmission errors or vandals.
4. Optimize performance. The VPCN must be designed to optimize use of the limited bandwidth of the Internet.
5. The VPCN must be able to support protocols that allow for the delivery, update, and invalidation of content and content profiles.
6. Content Providers and Surrogates can belong to different VPCN.
7. Compliance: The content source (provider) must be able to verify the members of the VPCN are generating content that is compliant by the content profile. This can be done by using the method of [17] or through the logging of some of the user's requests and the responses.

This section looks at how a VPCN service can be provided. The distinguishing characteristic of a VPCN is that packets are treated at the content layer. In VPCNs packets are forwarded to intermediaries that are member of the content path. Note that VPCN operation is decoupled from the mechanisms that are used to transport packets across the Internet.

The topology of a VPCN may consist of a full mesh of content tunnels between each VPCN node, or may be an arbitrary topology, such as a set of nodes connected to the nearest regional site. The regional sites may be connected together via a full or partial mesh.

The addressing used within a VPCN may have no relation to the addressing used on the IP backbone over which the VPCN is instantiated. Multiple VPCNs may be instantiated over the same set of physical devices, and they may use the same or overlapping address spaces.

In a VPCN forwarding of packets is performed at the content layer for a given content profile. Packets are forwarded at the application level to other OPES or non-OPES intermediaries or remote callout servers based on the content profile. Packets are forwarded to members' nodes only.

A single intermediary or content provider may belong concurrently to multiple VPCNs and may want to transmit traffic both onto one or more VPCNs.

There are a number of common requirements, which any network-based VPCN solution must address, and there are a number of different mechanisms that can be used to meet these requirements. These generic issues are 1. The use of a globally unique VPCN identifier in order to be able to refer to a particular VPCN.
2. VPCN membership determination. There should a mechanism that enables the VPCN nodes to determine member nodes in that VPCN.
3. Reachability information. VPCN nodes must be able to determine the reachability of other VPCN nodes.
4. Content Tunneling mechanism. A VPCN node must be able to construct the necessary tunnels to other nodes members in the VPCN. The nodes must be able to perform content tunneling on the packets that may include the encapsulation and de-encapsulation necessary to send and receive packets over the tunnels.
5. Authentication. VPCN nodes must be able to authenticate all members of the group.
6. Accounting/billing. Members of the VPCN must be able to bill each other for services that are being performed on content.
7. Content addition and deletion. Content providers must be able to inject content and its associated profile into the VPCN. Furthermore, they should be able to modify/delete that content, it's profile and any cached dynamic content.

In order to establish a VPCN, or to insert new nodes into an established VPCN, a mechanism must exist that can either perform the task through manual configuration or through an appropriate VPCN auto discovery and configuration protocol.

For subscribers that want to attach to the VPCN dynamically it is possible to Add them to the VPCN during the authentication phase. If the node is unsuccessfully authenticated (e.g. using a Radius server), then the newly created node can be bound to the correct VPCN. Note that static configuration information is still needed, for example to maintain the list of authorized subscribers for each VPCN. Whether a particular node joins the VPCN dynamically or statically (through configuration) the VPCN-ID can be used to determine the appropriate VPCN.

Packet based VPNs provide a mechanism for transmitting data packets in a secure fashion across public networks. Depending on how the VPNs are constructed, the packet routing decisions is performed at OSI layers 1 to 3. Packet based VPNs do not perform packet forwarding that are based on content type or based on rules that specify required adaptations on the content.

On the other hand, VPCN are layer 7 virtual private networks that perform routing decisions that are solely based on content types, content attributes and policies that are related to a given content. While the main task of packet based VPN is to deliver the packets in a secure fashion, the main objective of VPCN is to ensure the integrity of data at the content level.

VPCN can be constructed using any technology that ensures the appropriate delivery of content between two end points in the content path is a secure fashion. In this regard, VPCN can be constructed as overlay networks that uses basic packet based VPNs.

What is claimed is:

1. An overlay network comprising:
a computer readable medium upon which is stored a virtual content server for representing a content provider in a virtual content network, the virtual content network having an identifier and an associated content profile, the content profile including policy information regarding at least one of allowable transformations, adaptations and digital rights management applicable to the content, and wherein the virtual content server serves content of the content provider only to members of the virtual content network, wherein each member of the virtual content network agrees to act on the content according to the content profile associated with the content;

a client having a membership in the virtual content network;

and a provider for establishing a content tunnel between the virtual content server and the client for transferring content with trust and integrity at a content level by subscribing intermediate devices between the virtual content server and the client to the virtual content network as members responsive to the intermediate devices agreeing to at least a subset of policies in the content profile; and wherein content is routed between the virtual content server, intermediate devices and client using the content tunnels.

2. An overlay network as claimed in claim 1 wherein the virtual content server is implemented at protocol layer seven.

3. An overlay network as claimed in claim 1 wherein the virtual content network is implemented at protocol layer seven.

4. An overlay network as claimed in claim 1 wherein the identifier is unique within a physical network domain.

5. An overlay network as claimed in claim 1 wherein each member of the virtual content network uses the identifier to identify itself to the virtual content network.

6. A method of conveying content in a network comprising the steps of:
establishing an identifier associated with a content profile;

assigning the identifier to an entity desiring content thereby marking the entity as a first member, the content having an associated content profile, the content profile including policy information regarding at least one of allowable transformations, adaptations and digital rights management applicable to the content;

establishing a tunnel between the first member and a content provider responsive to the first member agreeing to act on the content according to the associated content profile, the step of establishing the tunnel including the step of subscribing at least one intermediate device disposed between the first member and the content provider to the connection responsive to the at least one intermediate device agreeing to act on the content according to the associated content profile; and transferring content between the content provider and the first member by routing content over a layer 7 protocol content tunnel associated with the identifier.

7. A method as claimed in claim 6 wherein the step of establishing a connection includes providing a first protocol layer 7 content tunnel between the content provider and intermediate member and a second protocol layer 7 content tunnel between the intermediate member and the first member.

8. A method as claimed in claim 6 wherein the step of establishing a connection includes providing a plurality of protocol layer 7 content tunnels between the content provider and the first member, via a plurality of intermediate members.

9. A method as claimed in any of claims 6 through 8 wherein the step of establishing an identifier includes defining an identification parameter at protocol layer seven.

* * * * *

UNITED STATES PATENT AND TRADEMARK OFFICE
CERTIFICATE OF CORRECTION

PATENT NO. : 7,610,332 B2  Page 1 of 1
APPLICATION NO. : 10/178131
DATED : October 27, 2009
INVENTOR(S) : Barbir et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 954 days.

Signed and Sealed this

Twelfth Day of October, 2010

David J. Kappos
*Director of the United States Patent and Trademark Office*